United States Patent [19]
Sharpe

[11] Patent Number: 5,818,344
[45] Date of Patent: Oct. 6, 1998

[54] SELECTIVE CALL SYSTEM WITH BIT RATE EMBEDDED IN SYNCHRONIZATION CODE WORD

[75] Inventor: Anthony K. Sharpe, Cambridge, Great Britain

[73] Assignee: U.S. Philips Corporation, New York, N.Y.

[21] Appl. No.: 932,518

[22] Filed: Sep. 18, 1997

Related U.S. Application Data

[63] Continuation of Ser. No. 374,744, Mar. 15, 1995, abandoned.

[30] Foreign Application Priority Data

Jun. 2, 1993 [GB] United Kingdom ............... 9311380

[51] Int. Cl.⁶ .................................................. H04Q 7/10
[52] U.S. Cl. ........................... 340/825.21; 340/311.1; 340/825.44; 340/825.52; 370/314; 375/368; 455/38.1
[58] Field of Search .................... 340/311.1, 825.14, 340/825.2, 825.21, 825.44, 825.47, 825.52, 825.68, 825.69; 375/362, 368, 365; 455/31.1, 38.1, 265; 370/310, 311, 312, 313, 314

[56] References Cited

U.S. PATENT DOCUMENTS

| | | | |
|---|---|---|---|
| 4,816,820 | 3/1989 | Davis | 340/825.44 |
| 4,961,073 | 10/1990 | Drapac et al. | 340/825.44 |
| 4,968,966 | 11/1990 | Jasinski et al. | 340/825.44 |
| 5,001,471 | 3/1991 | Snowden et al. | 340/825.21 |
| 5,414,419 | 5/1995 | Schwendeman et al. | 340/825.44 |
| 5,440,298 | 8/1995 | Kuramatsu et al. | 340/825.44 |
| 5,459,457 | 10/1995 | Sharpe | 340/825.44 |

FOREIGN PATENT DOCUMENTS 8809104  11/1988  WIPO.

*Primary Examiner*—Michael Horabik
*Assistant Examiner*—William H. Wilson, Jr.

[57] ABSTRACT

A selective call system including a base station having a transmitter for transmitting digital paging signals in the form of batches, each batch including a synchronization code word and concatenated message signals. While the bit rate of the message signals within each batch is the same, the synchronization code word of a particular batch contains information indicating the bit rate of the message signals in its batch.

8 Claims, 3 Drawing Sheets

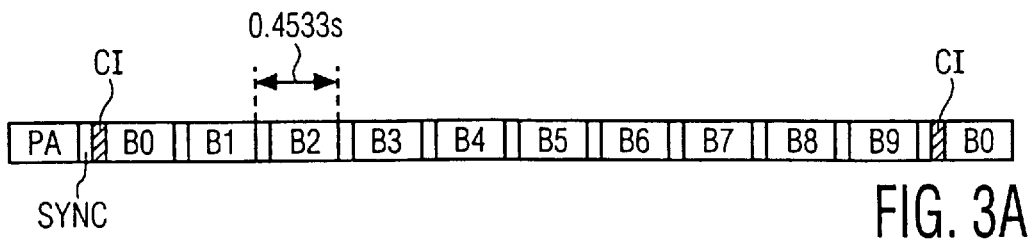
FIG. 3A
PRIOR ART
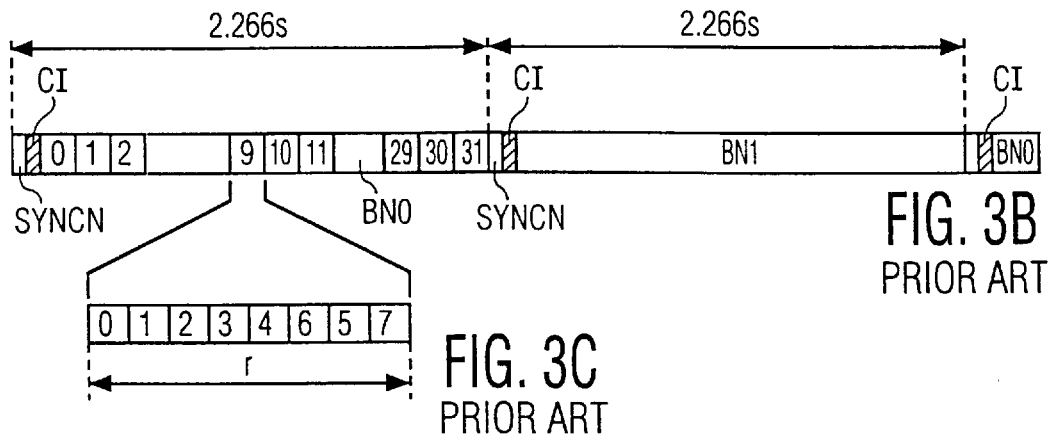
FIG. 3B
PRIOR ART
FIG. 3C
PRIOR ART
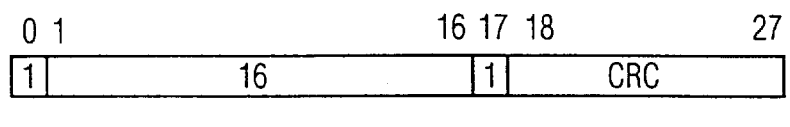
FIG. 3D
PRIOR ART
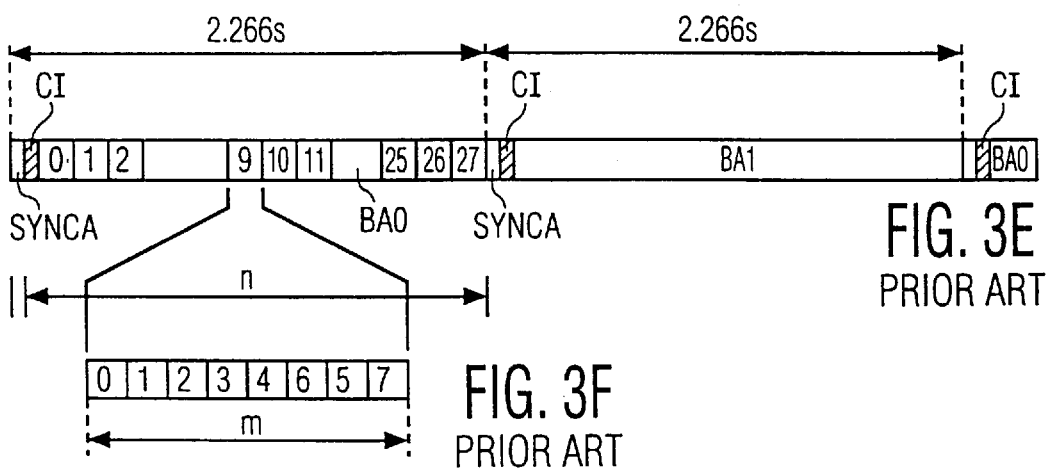
FIG. 3E
PRIOR ART
FIG. 3F
PRIOR ART
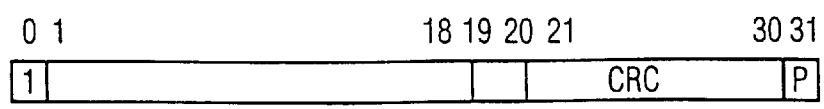
FIG. 3G
PRIOR ART

SELECTIVE CALL SYSTEM WITH BIT RATE EMBEDDED IN SYNCHRONIZATION CODE WORD

This is a continuation of application Ser. No. 08/374,744, filed Mar. 15, 1995 now abandoned.

The present invention relates to a selective call system, such as a paging system, and particularly to a system providing high speed alpha and numeric message capability.

For convenience of description the present invention will be described in the context of the CCIR Radiopaging Code No. 1 (otherwise known as POCSAG) which is described in detail in "The book of the CCIR Radiopaging Code No. 1" published by the Radiopaging Code Standards Group (RCSG) and obtainable from British Telecom, Radiopaging, London, England. However the invention may be applied to systems using other digital paging codes.

Appendix 1 of the mentioned book discloses the Specification for a standard Code Format for use in Wide Area Radiopaging Systems, the details of which will be known by those skilled in the art. However for the sake of completeness the signal format used comprises a batch structure consisting of preamble and a succession of concatenated batches. Each batch consists of a synchronisation code word plus 8 frames each comprising 2 code words, making a total of 17 code words. There are two types of code words, address code words and message code words each comprising 32 bits. In the case of a message code word 20 bits, that is bit 2 to bit 21 inclusive, form a data field and these are followed by parity check bits. In the case of an address code word, bits 2 to 19 are address bits, bits 20,21 are function bits and are used to select the format of decoding of concatenated message code words. Appendix 1, subsection 4.1 states that for the sole transmission of messages in decimal numbers, 4 bits per character are used and the function bits are set to 00. Subsection 4.2 refers to an Alpha-numeric or General Data Format and states that the ISO 7-bit coded character set is used and that the function bits are set to 11. When sending a message, the batch structure is maintained and in particular a synchronisation code word is included at the beginning of each batch. Thus a message comprises an address code word and concatenated message code words plus a synchronisation code word as required at the beginning of each new batch. The signals are generally sent at 1200 bits/second as 2-level signals. Whilst the POCSAG code is used quite widely by paging operators, there is a desire to increase the speed of numeric only, alpha only and alpha-numeric messages, particularly in city areas where there is generally a higher level of radio traffic in a relatively small radio coverage area compared to rural areas where the radio coverage area per paging network transmitter is greater. Merely increasing the bit rate but keeping the same POCSAG frame structure would in practice mean that the duration of a frame would be comparable to or less than the link establishment time of a paging receiver. Furthermore having separate pagers for city and rural areas is not economically attractive.

An object of the present invention is to improve the message throughput in a selective call system.

According to one aspect of the present invention there is provided a selective call system comprising a base station having means for transmitting digital paging signals in the form of batches comprising address signals and/or message signals and at least one selective call receiver having means for receiving signals addressed to it, characterised in that the base station has means for producing at least two different types of message signals, in that the base station has means for prefixing each batch with a synchronisation code word indicative of the message type, said synchronisation code word having a bit rate which is the same for all synchronisation code words irrespective of content, the selective call receiver having means responsive to the receipt of a synchronisation code word for conditioning the selective call receiver so that it can receive and decode a message signal addressed to the receiver in a batch concatenated with the received synchronisation code word.

The selective call system in accordance with the present invention is able to send several different types of data messages which are distinguished by using different synchronisation code words transmitted at one and the same bit rate and format. A selective call receiver can condition itself to receive and recover messages addressed to it in a particular batch by setting the modulation, bit rate, frame structure and/or code word structure in response to the particular synchronisation code word. In the case of high speed numeric, alpha and alpha-numeric messages, the duration of a batch is an integer multiple of the duration of a normal POCSAG batch and as a result the occurrence of a synchronisation code word always corresponds to a point in time when all the selective call receivers are activated to receive a synchronisation code word. A normal, for example standard POCSAG, selective call receiver realising that it cannot decode a synchronisation code word, powers down and is reactivated at the beginning of the next batch. By the synchronisation code word being sent once every POCSAG batch or multiples thereof, an operator can transmit a variety of types of signals in the knowledge that they can be received and recovered by the addressed selective call receiver. Further by making a batch have a duration which is an integral multiple of the duration of a normal POCSAG batch, the frame structure can be such as to be compatible with the link establishment time.

If desired each batch may include a channel indicator code word located for example immediately following the synchronisation code word. The provision of a channel indicator code word will permit multiple frequency operation.

According to a second aspect of the present invention there is provided a selective call receiver comprising receiving means, a decoding stage coupled to the receiving means and control means coupled to the decoding stage, wherein the control means has means for recognising a synchronisation code word indicative of one of at least two message types and means for conditioning at least the decoding stage to be able to decode the type of message signal concatenated with the synchronisation code word.

The present invention will now be described, by way of example, with reference to the accompanying drawings, wherein:

FIG. 3(A–G) illustrates batch structures of POCSAG and enhanced POCSAG numeric and alpha signal formats together with examples of numeric and alpha code word formats.

In the drawings the same reference numerals have been used to illustrate corresponding features.

Figure 1:
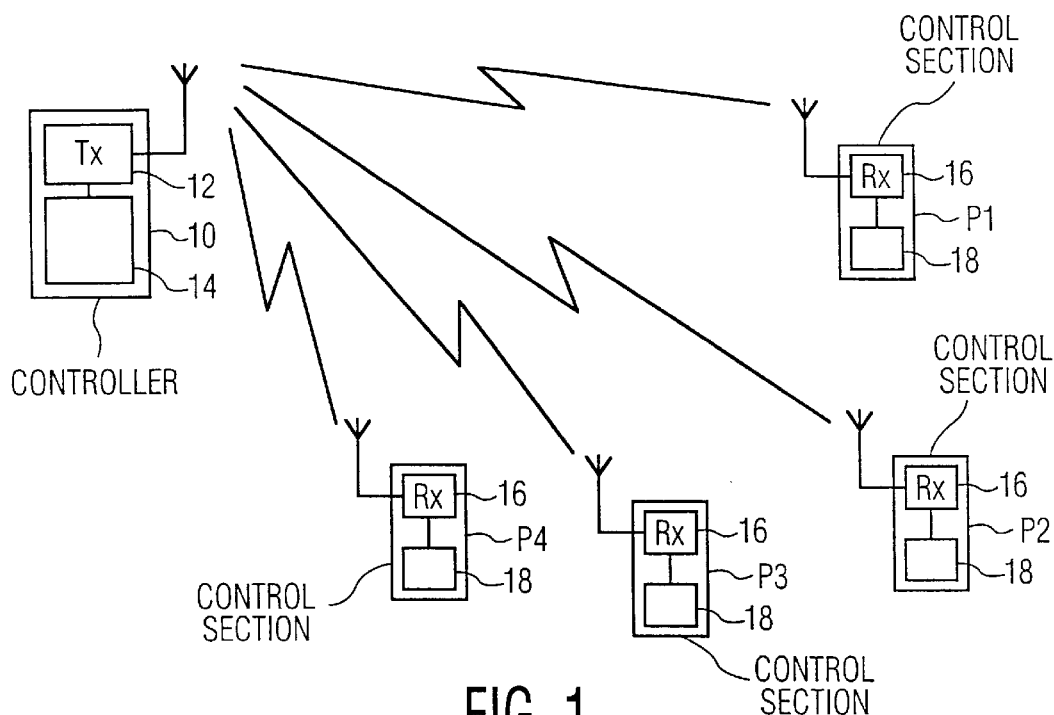
FIG. 1 is a diagram illustrating a selective call system.

The selective call system shown in FIG. 1 comprises a base station 10 which is equipped with a transmitter 12 and a controller 14 which includes means for formatting signals to be transmitted, the signals may comprise pager identity codes (RICs) and/or message data. The bit rate, mode of modulation, frame structure and code word structure of a message are selected to suit the particular application.

A plurality of selective call receivers (or pagers) P1 to P4 are provided. The pagers are able to roam in and out of the coverage area of the transmitter 12. Each pager P1 to P4 includes a receiving section 16 tuned to the frequency of the transmitter 12 and a control section 18 which controls the energisation of the receiving section and the energisation of an alerting device, for example an acoustic, visual and/or tactile transducer, in the event of the control section identifying the pager's RIC in a transmitted message.

Figure 2:
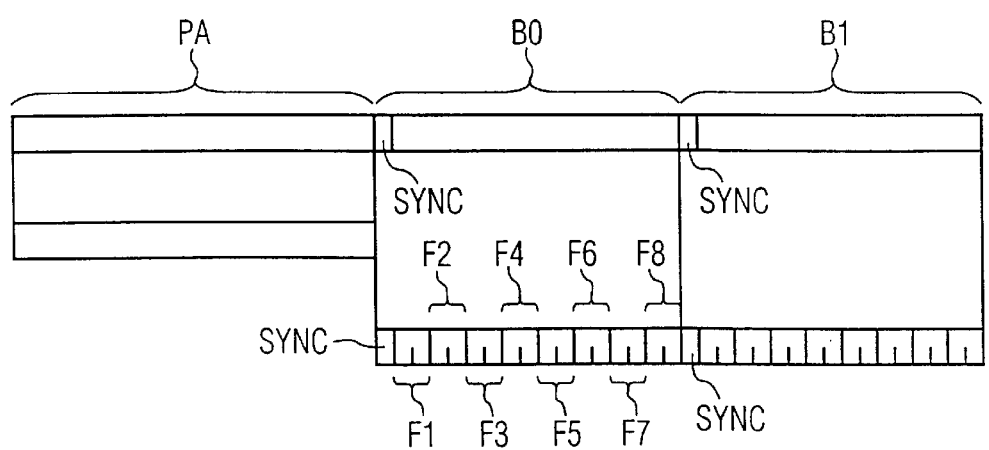
FIG. 2 is a diagram of the POCSAG signal format.

The signal format of the POCSAG or CCIR Radiopaging Code No. 1 will for the sake of comparison be described with reference to FIG. 2. The normal asynchronous POCSAG transmissions from the base station 10 comprise a series of bursts, each burst comprising a preamble PA of 576 bits which serve to enable the pagers P1 to P4 achieve bit synchronisation, followed by concatenated batches of code words including radio identification codes (RICs) and data messages. In the interests of brevity the transmission of data messages will not be described in detail. However the transmissions will be assumed to be at 1200 b/s and comprise 2 level, FSK signals. Each batch B0,B1 is arranged identically and comprises seventeen 32-bit code words. The first code word is a synchronisation code word SYNC which is used by a pager to achieve/maintain word synchronisation. The remaining sixteen code words are paired and each of the eight pairs is termed a frame, F1 to F8. Each pager is assigned to a particular frame which means that if it is being paged its RIC will be transmitted in that frame, say frame F4, and no other. Thus as part of the inherent battery power conservation feature of POCSAG, the pager must energise its receiving section 16 firstly to be able to receive the synchronisation code word and secondly for the duration of its frame, in this example F4, but for the duration of the other frames, that is F1 to F3 and F5 to F8, the receiving section 16 can be de-energised.

As mentioned in the preamble there is a desire by paging operators to be able to implement high rate, that is greater than 1200 bits/second, numeric only, alpha only and alphanumeric message service in this example which is transparent to users of normal POCSAG pagers.

In accordance with the present invention this desire for an upgraded service can be met in a way which is transparent to normal users of a standard digital paging protocol, such as POCSAG, by having enhancements in which batch, frame and code word structures may be different as well as having different (higher) bit rates and/or modulation schemes, but maintaining the structure and bit rate of the synchronisation code word substantially the same. The duration of an enhanced batch is made a multiple of a standard batch duration so that periodically, determined by the lowest common multiple of the batch durations, all the currently operating pagers are simultaneously energised to receive the next synchronisation code word. The synchronisation code words themselves will for the enhanced paging services either contain coded data which is decoded by a pager and used to condition the pager so it is capable of receiving the data message subsequently transmitted or be of a type which on being recognised by a pager which has been preprogrammed with these synchronisation code words and the associated data, causes the pager to condition itself.

Diagram A of FIG. 3 shows the standard POCSAG format comprising a preamble PA and concatenated batches B0 to B9, B0 to B9 and so on. At the beginning of each batch there is a 32 bit synchronisation code word SYNC. At a bit rate of 1200 bits per second, each batch of seventeen 32 bit code words has a duration of 0.4533 seconds.

Diagram B shows an example of a batch structure for enhanced numeric only messages. In this example each concatenated batch BN0, BN1 has a duration of five standard POCSAG batches, that is 2.266 seconds. As shown in diagrams B and C each numeric batch BN0, BN1 comprises a 32 bit, 1200 bits per second synchronisation code word SYNCN and 32 frames, each frame being formed by 8 code words. Diagram D gives one example of a (28:18 BCH) code word structure formed by a flag bit, bit 0 which has a binary value 0 for an address code word and 1 for a message code word, bits 1 to 16 for an address, bit 17 for a function bit and bits 18 to 27 for cyclic redundancy check bits (CRC).

Diagram E illustrates an example of a batch structure for enhanced alpha messages. Each of the concatenated batches BA0, BA1 has a duration of five standard POCSAG batches, that is 2.266 seconds. As shown in diagrams E and F each alpha batch BA0, BA1 comprises a 32 bit, 1200 bits per second synchronisation code word SYNCA and 28 frames, each frame being formed by 8 interleaved code words. Diagram G gives one example of a (32:21 BCH+parity) code word structure formed by a flag bit, bit 0, bits 1 to 18 for an address, bits 19,20 for function bits, bits 21 to 30 for CRC bits and bit 31 for an even parity bit.

Diagrams B to G relate to one example of an enhanced numeric and alpha message structure. However other examples are possible within a batch structure of 2.266 secs depending on the bit rate and modulation schemes used. The following table summarises one scheme:

| Bit Rate (bits per second) | Modulation Levels | Number of Numeric Frames to a 2.266 second Batch | Number of Numeric Code Words to a Frame r | Number to Alpha Frames to a 2.266 second Batch n | Number of Interleaved Alpha Code Words to a Frame m |
|---|---|---|---|---|---|
| 2400 | 2 | 32 | 6 | 21 | 8 |
| 3200 | 2 | 32 | 8 | 28 | 8 |
| 4800 | 2/4 | 32 | 12 | 21 | 16 |
| 6400 | 4 | 32 | 16 | 28 | 16 |

Comparing diagrams A,B and E it will be noted that the synchronisation code words SYNCN and SYNCA occur at the same time as a standard POCSAG synchronisation code word SYNC. This means that in a selective call system in which alpha only and numeric only messages are mixed with standard POCSAG messages transmitted at 1200 bits per second, an agile pager by detecting the synchronisation code word transmitted once in N frames, where N is an integer equal to 5 in FIG. 3, can adapt itself based on the nature of the sychronsiation code word in readiness to be able to receive the address code word(s) which follow and, if its RIC corresponds to that of the pager, be able to decode the concatenated message code words. A standard POCSAG pager on detecting the presence of a synchronisation code word of non-standard format simply de-activates its receiver section until the beginning of either the next following standard POCSAG batch or the Nth following standard POCSAG batch.

Figure 4:
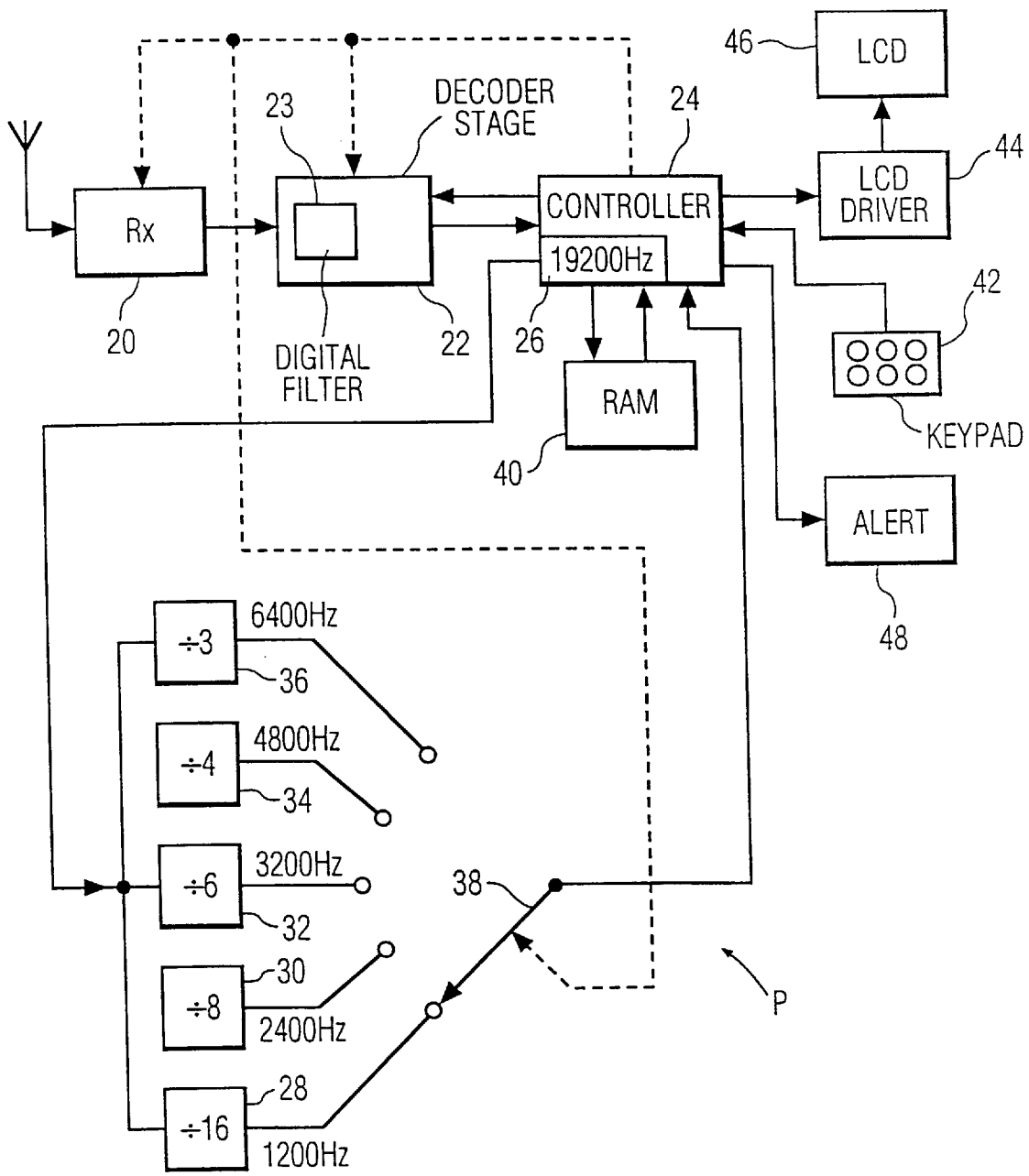
FIG. 4 is a simplified block schematic diagram of a pager.

FIG. 4 illustrates a selective call receiver or pager P which comprises a radio receiver 20 which is periodically energised to be able to receive a 1200 bits per second synchronisation code word at the beginning of each batch. The synchronisation code word is decoded in a decoding stage 22 and is passed to a controller 24 in which it is used to synchronise the pager's clock 26. If the synchronisation code word is non-standard, that is say SYNCN or SYNCA (FIG. 3), the special information contained within it is recovered and is used by the controller 24 to select the number of modulation levels in the receiver and to select the bit rate used in the following message and the other items of information summarised in the foregoing table. Alternatively, the controller is preprogrammed with details of different synchronisation code words and when any one particular synchronisation code word is received the controller 24 conditions the pager using pre-stored information relating to that particular code word. In order to be able to detect synchronously the bits in an enhanced numeric, alpha message or alpha-numeric message which may have a bit rate of 2400 Hz, 3200 Hz, 4800 Hz or 6400 Hz, the clock 26 has a frequency of 19200 Hz which is supplied to a series of dividers 28,30,32,34 and 36 which respectively divide the clock signal by 16,8,6,4 and 3 to produce clock frequencies of 1200 Hz, 2400 Hz, 3200 Hz, 4800 Hz and 6400 Hz. A switch 38 selects one of these frequencies under the control of the controller 24 and is supplied as required to the relevant parts of the pager, for example to a digital filter 23 at the front end of the decoding stage 22. The pager P further comprises a RAM 40 for storing decoded numeric and alpha messages. By actuating an appropriate key or keys on a key pad 42, messages are read out from the RAM 40 and supplied to a L.C.D. driver 44 for displaying on a LCD panel 46. One or more alerting transducers are collectively shown by the box 48. The transducers may provide audio, visual and/or tactile alerts.

As is known paging signals are frequently transmitted asynchronously in bursts and a pager's receiver 20 is energised in accordance with a predetermined algorithm in order to detect preamble PA which comprises alternate "1"s and "0"s transmitted at 1200 bits per second. When detecting preamble the controller 24 causes the switch 38 to be connected to the output of the divider 28 which amongst other things causes the bandwidth of the digital filter 23 in the decoding stage to be narrowed. Once preamble has been detected, the receiver 20 remains energised to detect the synchronisation code word. This code word is examined by the controller 24 to determine if it is a standard POCSAG code word or one identifying one of the enhanced formats, for example as described with reference to FIG. 3. Assuming that it is one of the latter synchronisation code words, then the controller 24 conditions the pager by for example actuating the switch 38 so that it selects the output of one of the dividers 30 to 36 which in turn widens the bandwidth of the digital filter 23 appropriately so that it can receive the address and message code words contained in the following batch. If the received RIC corresponds to one assigned to the pager P, it remains energised to process the subsequent message. Optionally the user may be alerted by the controller 24 causing the alerting transducer(s) 48 to be energised. At the commencement of each new batch, the synchronisation code word is checked and the pager P is conditioned as necessary in order to be able to receive and process the next batch which may be of a different format, bit rate and modulation type to the immediately preceding batch. A decoded message is stored in the RAM 40 and when convenient to the user the message is read-out and displayed on the LCD panel 46.

If a user moves from a city area in which the enhanced POCSAG protocols are used to a rural area where the standard POCSAG protocol is used with a bit rate of 1200 bits per second, no intervention by the user is required because the synchronisation code words are always at this bit rate and the pager conditions itself in accordance with the most recently received synchronisation code word.

Messages may be encoded in a suitable manner, for example binary for numeric messages and ASCII 7 bit characters for alpha and alpha-numeric messages.

It is possible for a paging receiver to be constructed to receive say only 2 numeric only formats, for example binary and hexa-decimal, and no standard POCSAG signals. Nevertheless for system compatibility reasons the bit rate of the synchronisation code words is always the same.

In an embodiment of the present invention in which the base station transmissions of several selective call systems are synchronised, there is no necessity to transmit preamble at the beginning of each burst transmission.

If a user switches on his pager which is unable to receive any synchronisation code word for example because there are no transmissions, the pager receiver remains energised for a predetermined time period, say 2 minutes, after which it is de-energised for another predetermined time period after which it is intermittently energised for 2.266 seconds in anticipation of detecting a synchronisation code word.

A refinement of the paging system is to have multiple frequency operation and for the first code word following the synchronisation code word to comprise a channel indicator CI (FIG. 3 diagrams A, B and E) which is unique to each operator. The pager is preprogrammed with the channel frequencies which are available to it. If a pager is tuned to one of the permitted channel frequencies but does not detect any signal for a predetermined time period, for example 2 minutes, it switches to another permitted channel frequency and switches on its receiver for say the period of enhanced batch (2.266 seconds) and looks for a synchronisation code word and the channel indicator code word CI. If it recognises both the synchronisation code word and the channel indicator code word, the pager remains on that channel frequency. However if it does not, the pager changes to another channel frequency and looks again for a known channel indicator code word.

Although the present specification discloses one embodiment of the invention in detail, the various numerical values given are not intended to be limiting.

From reading the present disclosure, other modifications will be apparent to persons skilled in the art. Such modifications may involve other features which are already known in the design, manufacture and use of selective call systems and component parts thereof, and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

I claim:

1. A selective call system comprising:

a base station comprising a transmitter for transmitting digital paging signals in the form of batches, each batch including a synchronization code word and concatenated message signals, each message signal having an address code word concatenated with at least one message code word, the bit rate of the message signals within each batch being the same, means for transmitting batches of message signals and means for configuring the synchronization code word of a batch to indicate the bit rate of the message signals in its batch; said synchronization code word being transmitted at a bit rate which is the same for all the synchronization code words irrespective of content; and at least one selective call receiver having means for receiving and decoding a message signal addressed thereto, means for decoding a synchronization code word and for conditioning the selective call receiver to decode a message signal addressed to the receiver.

2. A system as claimed in claim 1, wherein the bit rate of the message code words in a batch concatenated with a synchronisation code word is higher than that of the synchronisation code word.

3. A system as claimed in claim 1, wherein the bit rate is at least twice that of the synchronization code word.

4. A system as claimed in claim 3, wherein a batch comprises a predetermined plurality of frames and the higher the bit rate, the larger the number of code words to a frame.

5. A system as claimed in claim 3, wherein the higher bit rate message code words are modulated at M-levels, where M is an even integer equal to at least 2.

6. A system as claimed in claim 1, wherein there are numeric only and alphanumeric message signals and in that the format of an address code word of a numeric only message is different from the format of an address code word of an alpha message.

7. A system as claimed in claim 6, wherein alpha code words of the second type are bit interleaved.

8. A system as claimed in claim 1, wherein each batch includes a channel indicator codeword.

* * * * *